(12) United States Patent
Gooding

(10) Patent No.: US 7,954,012 B2
(45) Date of Patent: May 31, 2011

(54) HIERARCHICAL DEBUG INFORMATION COLLECTION

(75) Inventor: Thomas M. Gooding, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 12/258,989

(22) Filed: Oct. 27, 2008

(65) Prior Publication Data

US 2010/0107012 A1    Apr. 29, 2010

(51) Int. Cl.
*G06F 11/00*    (2006.01)
(52) U.S. Cl. .......................... 714/45; 714/37
(58) Field of Classification Search .............. 714/37, 714/38, 39, 45; 717/124, 126, 128
See application file for complete search history.

(56) References Cited

U.S. PATENT DOCUMENTS

| | | | |
|---|---|---|---|
| 7,562,258 B2 * | 7/2009 | Williams et al. | 714/45 |
| 7,716,407 B2 * | 5/2010 | Almasi et al. | 710/260 |
| 2002/0144019 A1 * | 10/2002 | Gooding | 709/330 |
| 2003/0061550 A1 * | 3/2003 | Ng et al. | 714/45 |
| 2003/0217087 A1 * | 11/2003 | Chase et al. | 709/1 |
| 2005/0081112 A1 * | 4/2005 | Aguilar et al. | 714/39 |
| 2007/0234294 A1 | 10/2007 | Gooding | |
| 2008/0126767 A1 | 5/2008 | Gooding et al. | |

* cited by examiner

*Primary Examiner* — Dieu-Minh Le
(74) *Attorney, Agent, or Firm* — Patterson & Sheridan, LLP

(57) ABSTRACT

Embodiments of the invention are generally related to retrieving debug data from a plurality of nodes of a parallel computer system. To retrieve debug data, a message may be broadcast from a service node of the system to each of the plurality of nodes via a first network, the message indicating a debug operation that is to be performed. A node of the plurality of nodes may transfer an interrupt signal to the rest of the plurality of nodes via a second network. Upon receiving the interrupt signal, the plurality of nodes may perform the debug operation comprising transferring the debug data to the service node via a third network.

25 Claims, 8 Drawing Sheets

HIERARCHICAL DEBUG INFORMATION COLLECTION

BACKGROUND OF THE INVENTION

1. Field of the Invention

The present invention is generally related to debugging, and more specifically to debugging in a parallel computing system.

2. Description of the Related Art

Powerful computers may be designed as highly parallel systems where the processing activity of hundreds, if not thousands, of processors (CPUs) are coordinated to perform computing tasks. These systems are highly useful for a broad variety of applications including, financial modeling, hydrodynamics, quantum chemistry, astronomy, weather modeling and prediction, geological modeling, prime number factoring, image processing (e.g., CGI animations and rendering), to name but a few examples.

For example, one family of parallel computing systems has been (and continues to be) developed by International Business Machines (IBM) under the name Blue Gene®. The Blue Gene/L architecture provides a scalable, parallel computer that may be configured with a maximum of 65,536 ($2^{16}$) compute nodes. Each compute node includes a single application specific integrated circuit (ASIC) with 2 CPU's and memory. The Blue Gene/L architecture has been successful and on Oct. 27, 2005, IBM announced that a Blue Gene/L system had reached an operational speed of 280.6 teraflops (280.6 trillion floating-point operations per second), making it the fastest computer in the world at that time. Further, as of June 2005, Blue Gene/L installations at various sites worldwide were among five out of the ten top most powerful computers in the world.

With such large numbers of compute nodes working in parallel, it is possible that one or more compute nodes may encounter hardware and/or software failures while performing a task. Recovering from such failures may involve retrieving a stack traceback from each processor node which may allow identification of error causing conditions.

SUMMARY OF THE INVENTION

The present invention is generally related to debugging, and more specifically to debugging in a parallel computing system.

One embodiment of the invention provides a method of retrieving debug data from a plurality of nodes of a parallel computer system, each node comprising at least one processor and memory, the plurality of nodes comprising at least one first node, a plurality of second nodes coupled with the first node, and a third node. The method generally comprises broadcasting a message from a service node of the computer system to the plurality of nodes via a first network connecting the service node to the plurality of nodes, wherein the message indicates a debug operation to be performed by the plurality of nodes, and generating an interrupt signal at the third node. The method further comprises transferring the interrupt signal from the third node to remaining nodes of the plurality of nodes via a second network coupling each node of the plurality of nodes to at least one other node, and at each of the second nodes, performing the debug operation comprising transferring debug data from the second node to the respective first node in response to receiving the interrupt signal.

Another embodiment of the invention provides a computer readable storage medium comprising a program product which, when executed by a processor is configured to perform an operation for retrieving debug data from a plurality of nodes of a parallel computer system, each node comprising at least one processor and memory, the plurality of nodes comprising at least one first node, a plurality of second nodes coupled with the first node, and a third node. The operation generally comprises broadcasting a message from a service node of the computer system to the plurality of nodes via a first network connecting the service node to the plurality of nodes, wherein the message indicates a debug operation to be performed by the plurality of nodes, and generating an interrupt signal at the third node. The operation further comprises transferring the interrupt signal from the third node to remaining nodes of the plurality of nodes via a second network coupling each node of the plurality of nodes to at least one other node, and at each of the second nodes performing the debug operation comprising transferring debug data from the second node to the respective first node, in response to receiving the interrupt signal.

Yet another embodiment of the invention provides a parallel computer system comprising a plurality of nodes comprising at least one first node, a plurality of second nodes coupled with the at least one first node, and a third node, wherein each of the plurality of nodes comprise at least one processor and memory, and a service node comprising a debug program. The debug program, when executed by a processor of the service node, is configured to broadcast a message to the plurality of nodes via a first network connecting the service node to the plurality of nodes, wherein the message indicates a debug operation to be performed by the plurality of nodes, and generate an interrupt signal at the third node of the plurality of nodes. The third node is configured to transfer the interrupt signal to remaining nodes of the plurality of nodes via a second network coupling each node of the plurality of nodes to at least one other node, upon receiving the interrupt signal. Each of the second nodes is configured to perform the debug operation by transferring debug data from the second node to the respective first node, upon receiving the interrupt signal.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1A:
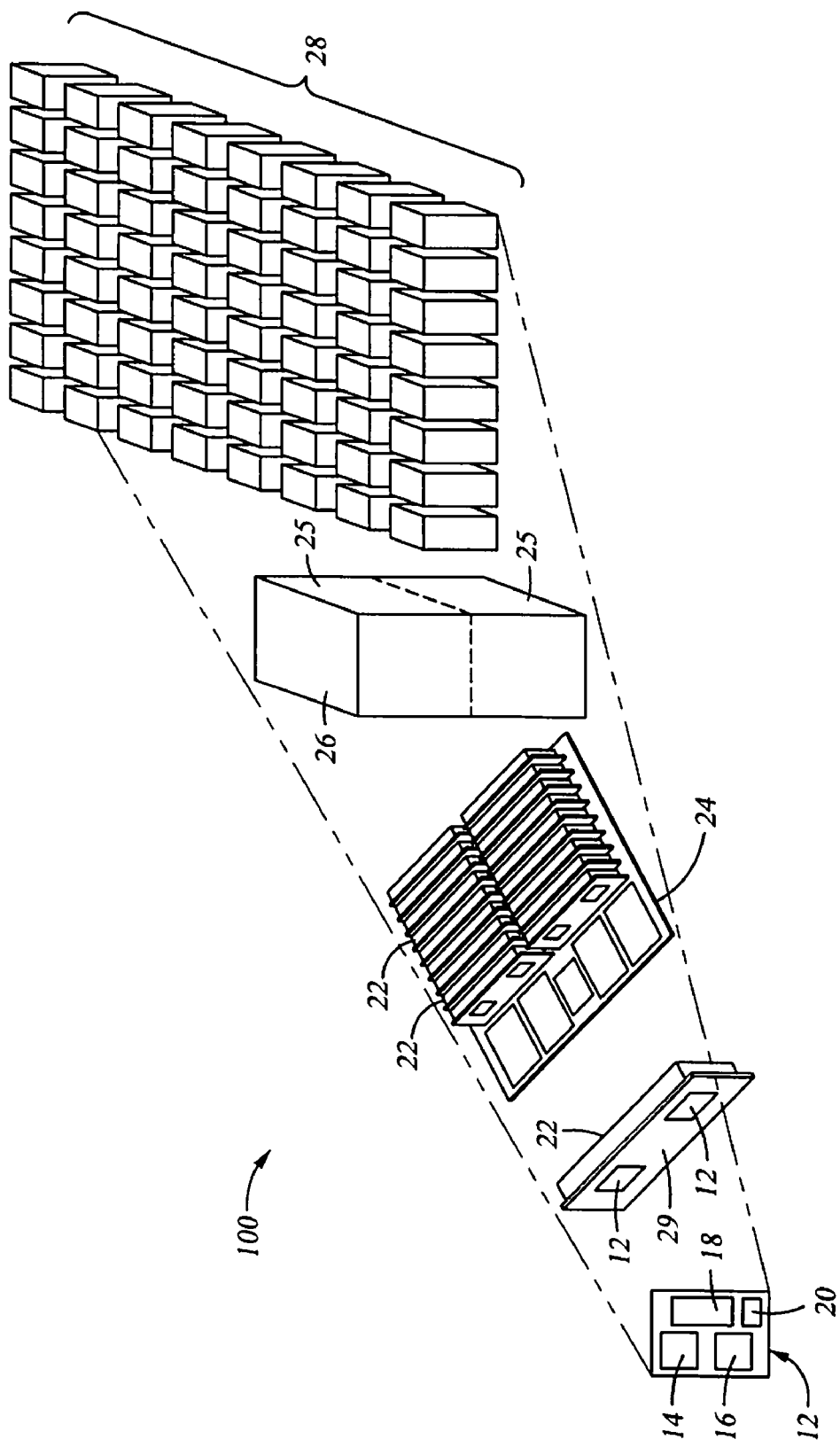
FIGS. 1A and 1B illustrates an exemplary system according to an embodiment of the invention.

The present invention is generally related to debugging, and more specifically to debugging in a parallel computing system. To retrieve debug data for debugging, a message may be broadcast from a service node of the system to each of a plurality of nodes of the system via a first network, the message indicating a debug operation that is to be performed. A node of the plurality of nodes may transfer an interrupt signal to the rest of the plurality of nodes via a second network. Upon receiving the interrupt signal, the plurality of nodes may perform the debug operation comprising transferring the debug data to the service node via a third network.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Exemplary System

Figure 1B:
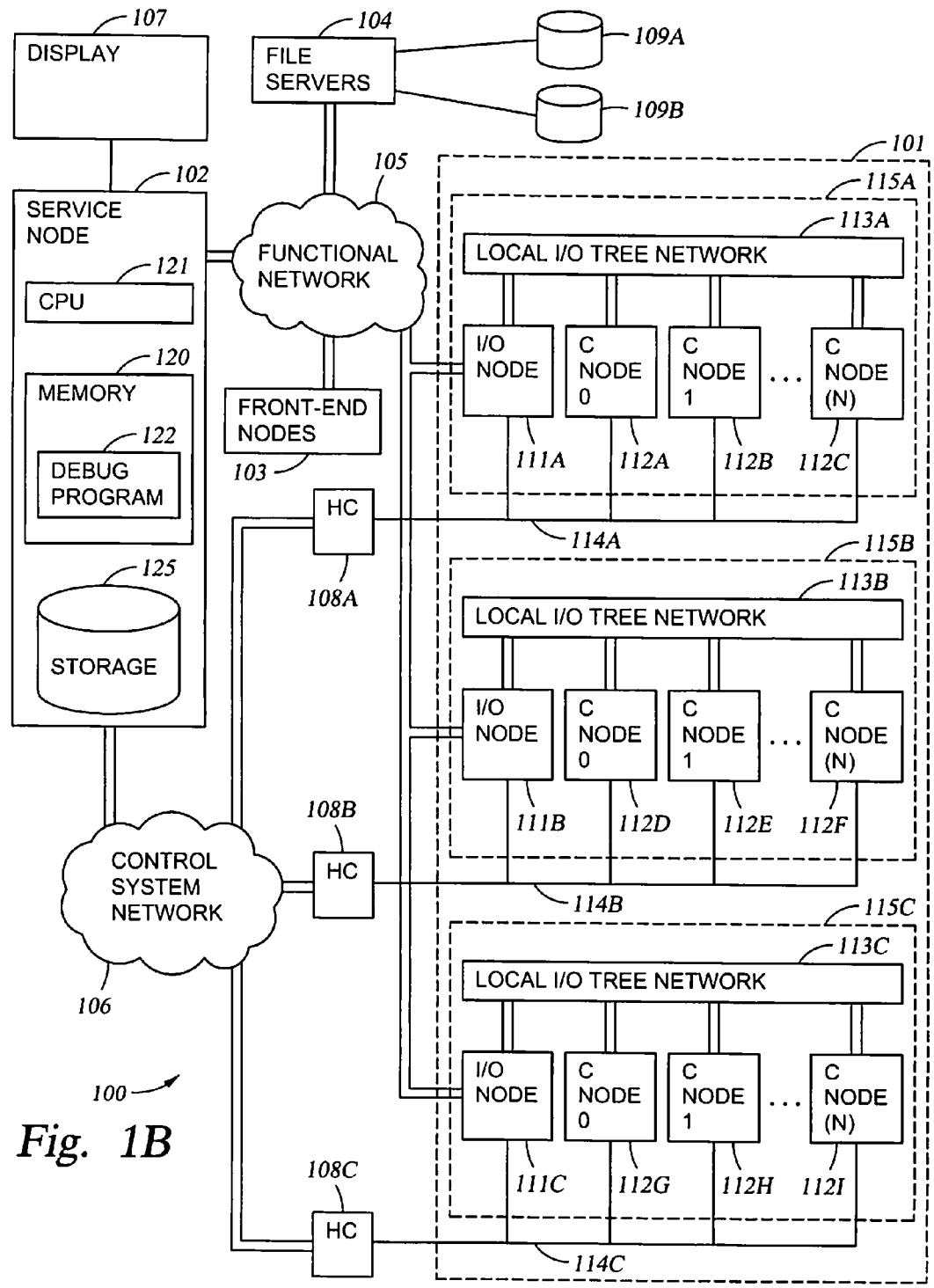

FIGS. 1A and 1B illustrate high-level diagrams of components of a massively parallel computer system 100, according to one embodiment of the invention. Illustratively, computer system 100 shows the high-level architecture of an IBM Blue Gene® computer system, it being understood that other parallel computer systems could be used, and the description of a preferred embodiment herein is not intended to limit the present invention.

FIG. 1A illustrates an exemplary parallel processing system 100, according to an embodiment of the invention. In general, the system 100 may include a highly scalable, cellular architecture that can be replicated in a regular pattern, as the system is scaled up. As illustrated in FIG. 1A, the parallel processing system 100 may generally include a plurality of nodes 12. In one embodiment, each node 12 may generally include two Application Specific Integrated Circuits (ASIC's) 14, 16, a local cache memory 18 and an Input/Output (I/O) interface 20. ASIC's 14, 16 may share external memory 29 located on a compute card 22, onto which the two nodes 12 may be mounted.

In one embodiment, a plurality of compute cards may be placed on node card 24. For example, in one embodiment, sixteen compute cards 22 may be placed on a node card 24. A plurality of node cards 24 may form a mid plane 25. For example, in one embodiment, sixteen node cards 24 may form a midplane, or cell 25. In one embodiment, two mid planes 25 may be placed inside a cabinet 26 for a total of 1024 nodes, or 512 nodes per mid plane 25, in one embodiment. The system 100 may include any number of cabinets 26, for example, sixty-four cabinets and over sixty-five thousand nodes, in one embodiment.

FIG. 1B illustrates a relational view of system 100 components, according to an embodiment of the invention. As illustrated, computer system 100 may include a compute core 101 having a plurality of compute nodes 112 arranged in a regular array or matrix. Compute nodes 112 perform the useful work performed by system 100. The operation of computer system 100, including compute core 101 may be controlled by service node 102. Various additional processors in front-end nodes 103 may perform auxiliary data processing functions, and file servers 104 provide an interface to data storage devices such as disk based storage 109A, 109B or other I/O (not shown). Functional network 105 may provide the primary data communication path among compute core 101 and other system components. For example, data stored in storage devices attached to file servers 104 is loaded and stored to other system components through functional network 105.

Also, as shown, compute core 101 may include I/O nodes 111A-C and compute nodes 112A-I. The I/O nodes 111 and compute nodes 112 may be an example of the nodes 12 illustrated in FIG. 1A. Compute nodes 112 provide the processing capacity of parallel system 100, and are configured to execute applications written for parallel processing. I/O nodes 111 handle I/O operations on behalf of compute nodes 112. For example, the I/O node 111 may retrieve data from file servers 104 requested by one of compute nodes 112. Each I/O node 111 may include a processor and interface hardware that handles I/O operations for a set of N compute nodes 112, the I/O node and its respective set of N compute nodes are referred to as a Pset. Compute core 101 may include M Psets 115, each including a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by compute core 101 to execute user applications, as well as data output produced by the compute core 101, may be communicated over functional network 105. The compute nodes within a Pset 115 communicate with the corresponding I/O node over a corresponding local I/O tree network 113A-C. The I/O nodes, in turn, are connected to functional network 105, over which they communicate with I/O devices attached to file servers 104, or with other system components. Thus, the local I/O tree networks 113 may be viewed logically as extensions of functional network 105, and like functional network 105, are used for data I/O, although they are physically separated from functional network 105.

Service node 102 may be configured to direct the operation of the compute nodes 112 in compute core 101. In one embodiment, service node 102 is a computer system that includes a processor (or processors) 121, internal memory 120, and local storage 125. An attached console 107 (i.e., a keyboard, mouse, and display) may be used by a system administrator or similar person to initialize computing jobs on compute core 101. Service node 102 may also include an internal database 125 which maintains state information for the compute nodes in core 101, and a debugger program 122 which may be configured to, among other things, control the allocation of hardware in compute core 101, direct the loading of data on compute nodes 111, migrate process running on one of compute nodes 112 to another one of compute nodes 112, and perform diagnostic and maintenance functions.

In a particular embodiment, debugger program 122 may be configured to facilitate identification of errors in the compute nodes 112 and/or I/O nodes 111. In one embodiment of the invention, the debugger program 122 may be configured to retrieve data from the nodes, for example, stack traceback data, from the nodes using the service network to facilitate identification of software and/or hardware failures. The debugger program 122 and debugging methods are discussed in greater detail below.

In one embodiment, service node 102 communicates control and state information with the nodes of compute core 101 over control system network 106. Network 106 is coupled to a set of hardware controllers 108A-C, as illustrated in FIG. 1B. Each hardware controller may communicate with the nodes of a respective Pset 115 over a corresponding local hardware control network 114A-C. The hardware controllers 108 and local hardware control networks 114 are logically an extension of control system network 106, although physically separate.

In one embodiment of the invention, each hardware controller 108 may be configured to communicate with a plurality of Psets 115. In a particular embodiment, one hardware controller 108 and an associated plurality of Psets 115 may be arranged on a single node card 24 (see FIG. 1A) of system 100. In other words, each node card 24 may include a plurality of I/O nodes 111, a plurality of compute nodes 112 associated with each I/O node 111, and a respective hardware controller 108. In a particular embodiment, each node card 24 may include 32 compute nodes 112 and 4 I/O nodes 111.

In one embodiment, control system network 106 may include a JTAG (Joint Test Action Group) network, configured to provide a hardware monitoring facility. As is known, JTAG is a standard for providing external test access to integrated circuits serially, via a four- or five-pin external interface. The JTAG standard has been adopted as an IEEE standard. Within a Blue Gene system, the JTAG network may be used to send performance counter data to service node 102 in real-time. That is, while an application is running on compute core 101, performance data may be gathered and transmitted to service node 102 without affecting the performance of that application. In a particular embodiment of the invention, the network 114A-C may be used to perform JTAG accesses to the compute nodes 112 and I/O nodes 111 using the hardware controller 108. Embodiments of the invention are not limited to a JTAG network. In alternative embodiments, the control system network 106 may include SPI (Serial Peripheral Interface) network, 12C (Inter-integrated Circuit) network, and the like.

In addition to service node 102, front-end nodes 103 provide computer systems used to perform auxiliary functions which, for efficiency or otherwise, are best performed outside compute core 101. Functions which involve substantial I/O operations are generally performed in the front-end nodes 103. For example, interactive data input, application code editing, or other user interface functions are generally handled by front-end nodes 103, as is application code compilation. Front-end nodes 103 are also connected to functional network 105 and may communicate with file servers 104.

Figure 2A:
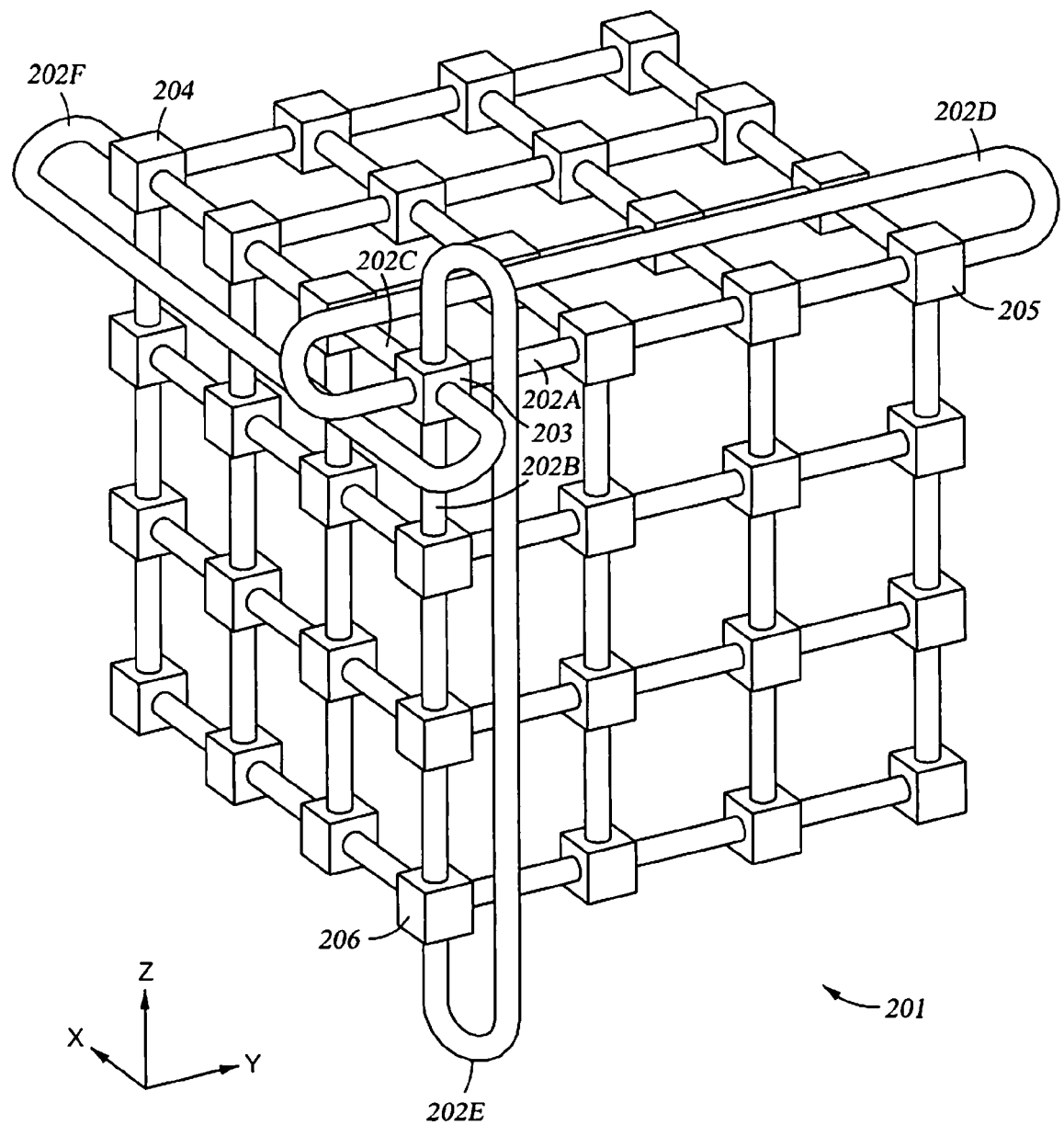
FIG. 2A illustrates an exemplary TORUS network according to an embodiment of the invention.

In a massively parallel computer system 100, compute nodes 112 may be interconnected via multiple, complementary, high-speed and/or low latency networks. For example, in one embodiment the compute nodes 112 may be logically arranged in a three-dimensional torus network, where each compute node 112 may be identified using an x, y and z coordinate. FIG. 2A is a conceptual illustration of a three-dimensional torus network of system 100, according to one embodiment of the invention. More specifically, FIG. 2A illustrates a 4×4×4 torus 201 of compute nodes, in which the interior nodes are omitted for clarity. Although FIG. 2 shows a 4×4×4 torus having 64 nodes, it will be understood that the actual number of compute nodes in a parallel computing system is typically much larger. For example, a complete Blue Gene/L system includes 65,536 compute nodes. Each compute node 112 in torus 201 includes a set of six node-to-node communication links 202A-F which allows each compute nodes in torus 201 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2A, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y, or z dimensions form a torus in that dimension because the point-to-point communication links logically wrap around. For example, this is represented in FIG. 2A by links 202D, 202E, and 202F which wrap around from compute node 203 to other end of compute core 201 in each of the x, y and z dimensions. Thus, although node 203 appears to be at a "corner" of the torus, node-to-node links 202A-F link node 203 to nodes 204, 205, and 206, in the x, y, and Z dimensions of torus 201.

In some embodiments, it may be desirable to allow compute nodes to send global interrupt and barrier signals to each other with very low latency so that all of the processing nodes participating in a particular undertaking attain a synchronous operating status. Accordingly, in one embodiment, the invention the compute nodes 112 may be interconnected by a global tree network, which may be provided for performing global functions over the entire parallel processing system 100. In one embodiment, the global tree network may be used to communicate state information of a particular compute node to one or more other compute nodes performing a particular calculation (or executing a specific application). For example, if an error occurs at a compute node, an interrupt signal may be sent via the global tree network to the one or more other compute nodes to initiate error recovery. The global tree network may also be used to send global barrier signals that prevent operations in one or more compute nodes until all processing nodes participating in a particular calculation reach a certain status.

Figure 2B:
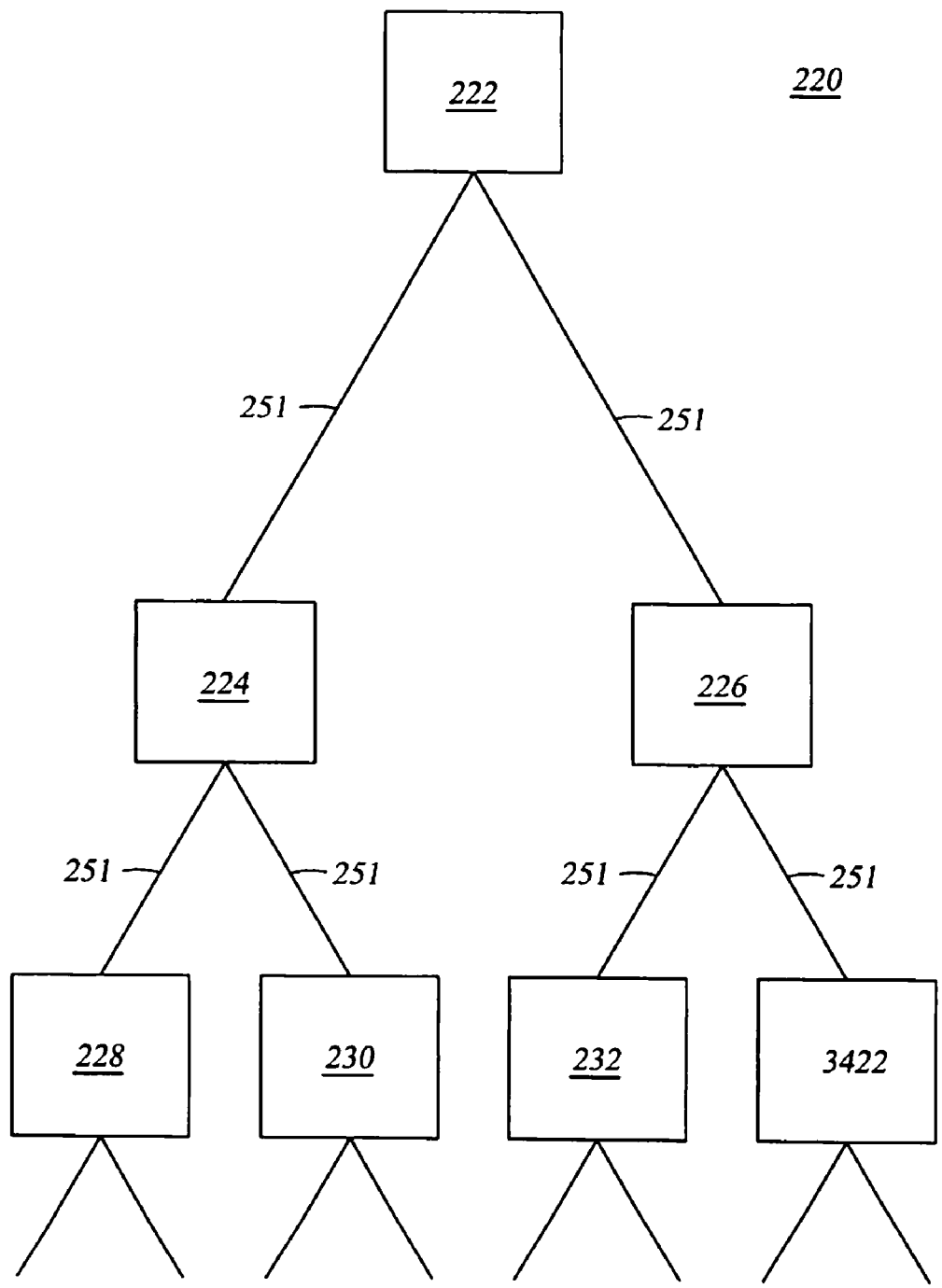
FIG. 2B illustrates an exemplary global tree network according to an embodiment of the invention.

FIG. 2B illustrates an exemplary global tree network 220, according to an embodiment of the invention. As illustrated in FIG. 2B, global tree network 220 may include a plurality of nodes (for example, nodes 222-234), wherein each node is coupled with a predetermined number of other nodes. For example, in FIG. 2B, each node is coupled with at least two other nodes via communication links 251. The nodes 222-234 may correspond to the compute nodes 112 and/or the I/O nodes 111 illustrated in FIG. 1B. In the particular embodiment illustrated in FIG. 2B, the global tree network is depicted as a binary tree, wherein each node has at least two child nodes. For example, nodes 224 and 226 are child nodes of node 222, and so on. In alternative embodiments, each node may have any number of child nodes.

The global tree network 220 may be used to transfer low latency global asynchronous or synchronous signals between the nodes. Transferring messages to the nodes in the global tree network 220 may involve receiving a message and transferring the message to respective child nodes. For example, node 222 may receive a message, for example, an interrupt or barrier message, and transfer the message to its respective child nodes 224 and 226. Each of nodes 224 and 226 may transfer the received message to their respective children 228-234, and so on.

In some embodiments, the message may travel up the global tree network in order to be propagated to all the nodes. For example, node 234 may generate an interrupt or barrier message, and transfer the message to its respective children and its parent node 226. Node 226 may transfer the message to any remaining children, for example, node 232, and to its respective parent node 222. Node 222 may transfer the message to node 224, thereby allowing the message to propagate to all nodes in the global tree network 220.

Figure 3:
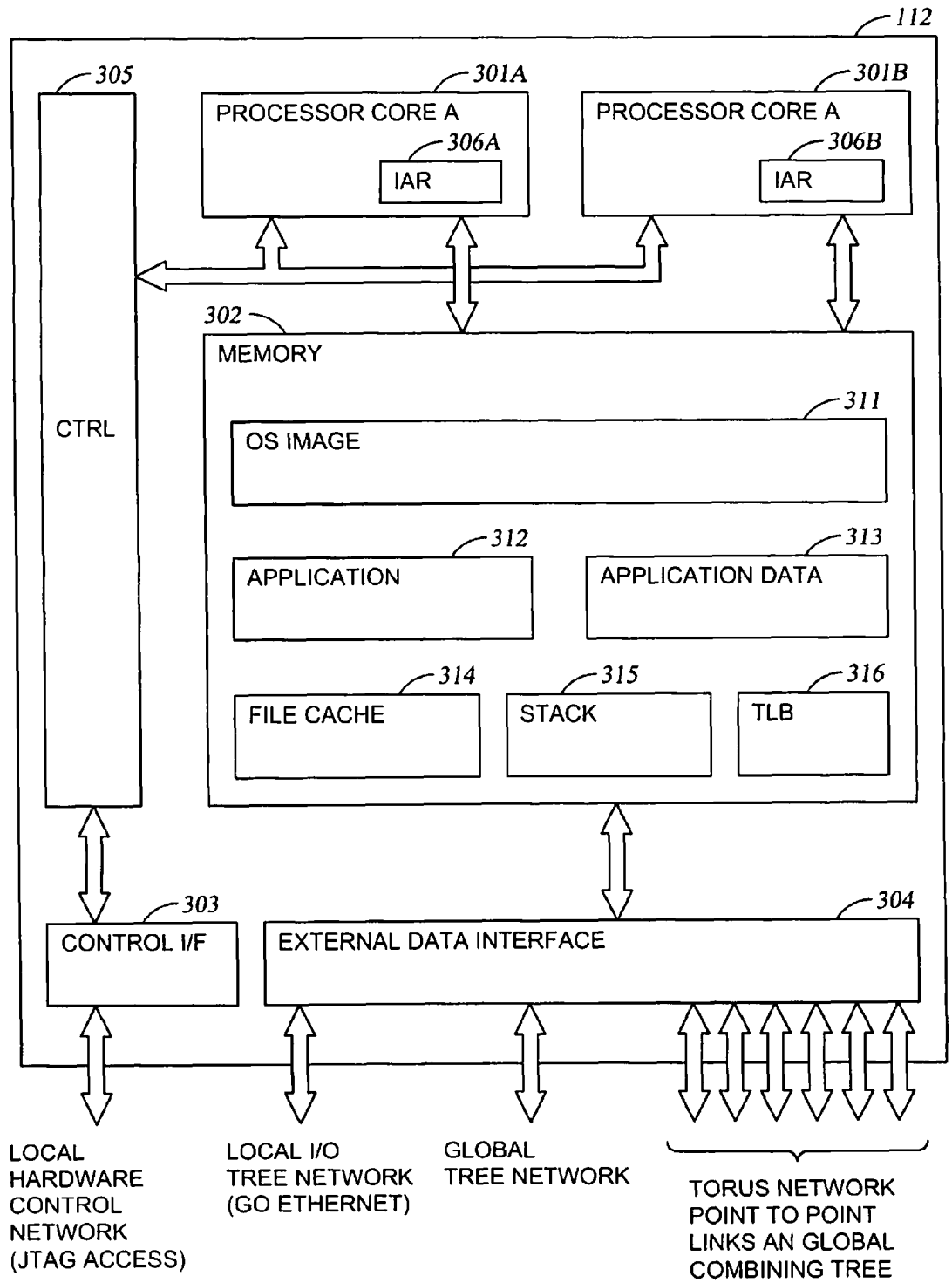
FIG. 3 illustrates an exemplary system node according to an embodiment of the invention.

Message passing in the global tree network 220 may be supported by processors within each compute node 112 and/or I/O node 111, thereby avoiding separate hardware chips and associated packaging for performing global asynchronous logic functions. FIG. 3 illustrates a high-level diagram of a compute node 112 of the system 100 of FIG. 1, according to one embodiment of the invention. The compute node 112 may correspond to the node 12 illustrated in FIG. 1A.

As shown IN FIG. 3, compute node 112 may include processor cores 301A and 301B, each having an instruction address register 306A and 306B. Compute node 112 also includes memory 302 used by both processor cores 301 and an external control interface 303 which is coupled to local hardware control network 114 (e.g., control system network 106). The compute node 112 also includes an external data communications interface 304 which is coupled to the corresponding local I/O tree network 113 (e.g., functional network 105), the corresponding six node-to-node links 202 of the torus network 201, and the global tree network 220. The compute node also includes monitoring and control logic 305 which receives and responds to control commands received through external control interface 303. Monitoring and control logic 305 may access processor cores 301 and locations in memory 302 on behalf of service node 102 to read (or in some cases alter) the operational state of node 112. In one embodiment, each compute node 112 may be physically implemented as a single integrated circuit.

As described, functional network 105 may service many I/O nodes 113, and each I/O node 113 is shared by a group of compute nodes 112 (i.e., a Pset). Thus, it is apparent that the I/O resources of parallel system 100 are relatively sparse when compared to computing resources. Although it is a general purpose computing machine, parallel system 100 is designed for maximum efficiency in applications which are computationally intense.

As shown in FIG. 3, memory 302 stores an operating system image 311, an application code image 312, and user application data structures 313, as required. Additionally, memory 302 may also include a file cache 314, i.e., a cache of data read from or to be written to an I/O file. Operating system image 311 provides a copy of a simplified-function operating system running on compute node 112. Operating system image 311 may include a minimal set of functions required to support operation of the compute node 112. In a Blue Gene system, for example, operating system image 311 contains a version of the Linux® operating system customized to run on compute node 112. Of course, other operating systems may be used, and further it is not necessary that all nodes employ the same operating system. (Also note, Linux® is a registered trademark of Linus Torvalds in the United States and other countries.)

Application code image 312 represents a copy of the parallel program being executed by compute nodes 112. Application code image 302 may include a copy of a computer program being executed by multiple compute nodes 112, but where the program is very large and complex, it may be subdivided into portions where different programs run on different compute nodes 112 to cooperate and, collectively, accomplish a parallel computing task. If a required code fragment does not exist in local memory, the Translation Look-aside Buffer (TLB) 316 may provide the location of a node that contains the fragment. Memory 302 may also include a call-return stack 315 for storing the states of procedures which must be returned to, which is shown separate from application code image 302, although it may be considered part of application code state data.

Debug Information Collection

With thousands of compute nodes operating simultaneously in the system 100, it is likely that one or more compute nodes will encounter a hardware or software failure. For example, an undesired voltage on a power supply line may adversely affect the ability of compute nodes to differentiate between different logical bits of data. Alternatively, software errors may cause one or more compute nodes to execute incorrect code. When such hardware or software errors occur, the system 100 may stall or perform tasks incorrectly. Therefore, it may be necessary to identify the nodes having an error condition so that appropriate corrective actions may be taken.

In a particular embodiment, detecting failures may involve, for example, determining whether the system is taking an unusually long time to perform a given task. Alternatively, a system error may be detected if the system does not return an expected result. Embodiments of the invention, however, are not limited to the error detection methods listed above. Any reasonable means for detecting an error may be implemented in other embodiments.

Resolving failures may involve retrieving debug data from each of the compute nodes. In one embodiment, debug data retrieved from the nodes may include any data about the physical and electrical characteristics of the node, for example, power levels, temperature measurements, timing parameters for memory, and the like. In other embodiments, the debug data may also include data stored in a register or memory at a particular node. For example, referring to FIG. 3, retrieving debug data may include retrieving data stored in the registers 306A, 306B, stack 315, or any other location in memory 302. The information retrieved from the nodes may be examined to determine the error causing condition. For example, in one embodiment, the data in instruction address registers 306A and/or 306B may be retrieved to determine a particular instruction that is being processed at the node. In an alternative embodiment, the data in stack 315 may be retrieved to determine a particular program module being executed by the node.

An analysis of the debug data may identify the particular nodes of the system having an error condition. For example, a plurality of nodes of the system may be configured to execute a particular program. The program may contain a plurality of modules, for example, function 1 and function 2. The stack data 315 may indicate the particular module being executed by each node in the system at a given time. If it is determined from retrieved stack data that all nodes except for one node are executing function 1, it is likely that the node not executing function 1 is an erroneous node.

The debug data may be retrieved using the JTAG network of the control system network 106. For example, referring to FIG. 3, control interface 303 may facilitate JTAG accesses to the registers and memory of each compute node 112, as illustrated. However, using the control system network 106 to retrieve the debug data may be time consuming an inefficient. For example, referring to FIG. 1B, retrieving debug data may involve communication between the debug program 122 and the hardware controllers 108 via the control system network. The debug program 122 at service node 102 may send a message to the hardware controllers 108 requesting debug data. The hardware controllers 108 may sequentially perform JTAG accesses to each of its associated compute nodes and/or service nodes and transfer the collected debug data back to the debug program 122 at the service node 102.

Because each node may have distinct debug data stored therein, each node may are queried in sequence by the hardware controllers 108. In systems where there are thousands of nodes, individually querying the nodes may take a long time, during which the system may have to be stalled. Furthermore, transferring the debug data from each of the hardware controllers 108 to the debug program 122 may also be time consuming in systems with a large number of hardware controllers.

Figure 4:
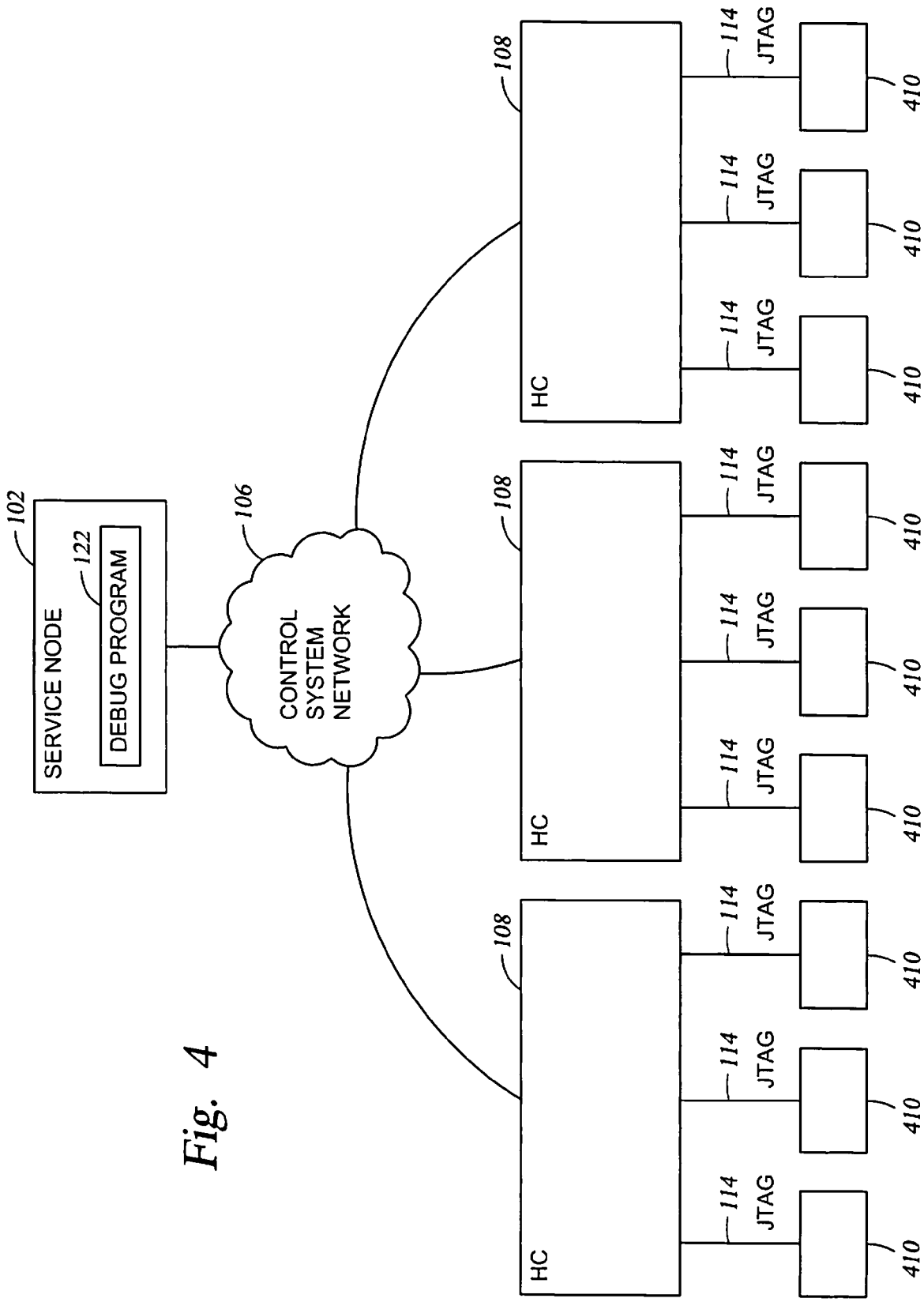
FIG. 4 illustrates an exemplary system network for broadcasting a message to system nodes, according to an embodiment of the invention.

Embodiments of the invention provide an efficient method for retrieving debug data from the compute nodes and I/O nodes. In one embodiment of the invention, the debug program 122 may be configured to perform a broadcast write operation of a message to all the nodes in the system via the service network 106. FIG. 4 illustrates an exemplary view of the control system network over which the message may be broadcast to a plurality of nodes 410. The nodes 410 may be any one of I/O nodes and compute nodes. For the sake of simplicity, only three hardware controllers 108 and nine nodes 410 are illustrated in FIG. 4. In alternative embodiments, any number of hardware controllers 108 may exist, and any number of nodes 410 may be coupled to each hardware controller 108.

As illustrated in FIG. 4, the message may be sent by the debugger program 112 at the service node 102 to one or more hardware controllers 108 via the service network 106 (see also FIG. 1B). Each hardware controller 108 receiving the message may perform JTAG accesses to respective nodes 410 via the JTAG network 114 to pass the message to the compute nodes and/or I/O nodes. In one embodiment, the JTAG accesses by the hardware controllers 108 may involve writing the message in a storage location of the nodes 410. For example, the message may be written into a register 306 or memory 302 of the node 410 (see also FIG. 3).

In one embodiment of the invention the message broadcast by the debugger program 122 may include an opcode and/or data. Any reasonable opcode may be used. In general, the opcode may be configured to cause the nodes to perform an operation. If a node successfully performs the operation associated with the opcode, it may indicate that the node is not the cause of an error condition. For example, in one embodiment, the opcode may be associated with an operation for returning a register value, a stack value, etc. In a particular embodiment, the opcode may be associated with a stack dumping operation, wherein the contents of stack 315 (see FIG. 3) of each node 410 is returned. Data may optionally be provided with the opcode to facilitate an operation associated with the opcode. For example, if the opcode is associated with a write operation, the data provided may include data to be written. In one embodiment, the operation may involve providing a status or state of the node. For example, the opcode may cause the node to return data identifying a particular module of an application that is being executed at the node.

Broadcasting the message to all the system nodes may be desirable because the broadcast may be performed to all or a subset of the system nodes with relatively low latency. In other words, because the same message is sent to all the nodes, the message may be written to the nodes at or near the same time rather than writing the message to the nodes sequentially, which may take a relatively long time.

In some embodiments, the system 100 may be partitioned into a plurality of partitions, wherein each partition includes a plurality of compute nodes 112 and I/O nodes 111. In a particular embodiment, each partition may be associated with a respective client according to a service license agreement (SLA). Because each client of system 100 may perform different tasks, each partition may execute different applications at any given time. Accordingly, in some embodiments, debugging may involve debugging nodes of a given partition of the system. In one embodiment, while debugging a particular partition, the debug program 122 may be configured to broadcast the message to the nodes of a particular partition only.

Generally, broadcasting the message to the nodes may not obstruct normal operation of the nodes. For example, the nodes of the system (or a partition) may continue to execute an application while the debug program 122 broadcasts and stores the message at the nodes via the service/JTAG network.

To retrieve debugging data, the debug program 122 may activate an interrupt channel of a single node 410, in one embodiment. For example, the debug program 122 may send a message to a hardware controller 108 associated with a particular node, for example, node 410a in FIG. 4. The hardware controller 108 may initiate a JTAG access to the node 410a, thereby causing the node 410a to assert a signal on an interrupt channel of the global tree network. For example, referring to FIG. 3, the node 410a may assert an interrupt signal to other nodes via the global tree network connection of the external data interface 304. The interrupt signal may be transferred to a plurality of nodes in the global tree network as described above, with relatively low latency.

In one embodiment of the invention, the interrupt signal may cause the nodes 410 to stop execution of applications. For example, in response to receiving the interrupt signal, the operating system 311 of each node may halt execution of the application 312, and save the state of the applications.

Furthermore, in response to receiving the interrupt signal, the operating system 311 may retrieve the message broadcast by the debug program 122 from memory, a register, or other location where the message is stored, and perform operations associated with an opcode contained in the message. As discussed above, the opcode may cause each node 410 to return stack data, node state information, and the like. The data returned from each node, is generally referred to hereinafter as debug data.

In one embodiment of the invention, debug data from each compute node 112 may be transferred to an I/O node 111 associated with the compute node 112, in response to receiving the interrupt signal. Each I/O node 111 may include a debugger proxy program configured to collect the debug data from the compute nodes, combine the debug data, and provide the combined data to the debug program 122 via the functional network 105. In some embodiments, the system 100 may include a hierarchy of I/O nodes 111. Accordingly, in such embodiments, debug information from a first I/O node may be transferred to a second I/O node in the hierarchy. The second I/O node may combine debug data from the first I/O node and one or more other I/O nodes and transfer the combined debug data to a third I/O node or the service node.

Figure 5:
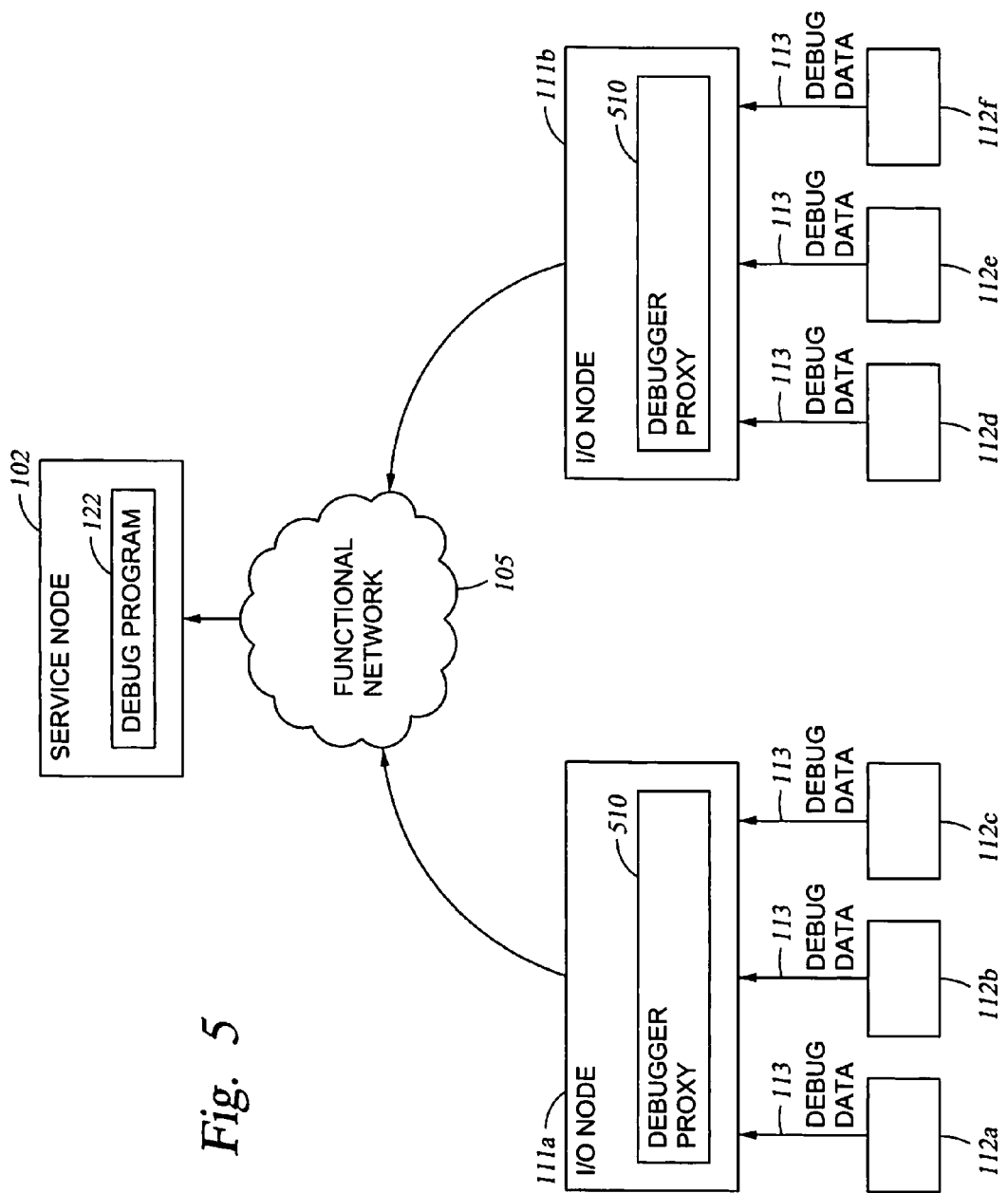
FIG. 5 illustrates an exemplary system network for retrieving debug data, according to an embodiment of the invention.

FIG. 5 illustrates the transfer of debug data from compute nodes 112 to the service node 102. While two I/O nodes 111 and six compute nodes 112 are illustrated in FIG. 5, in alternative embodiments, any number of I/O nodes may exist, with any number of compute nodes 112 coupled therewith. As illustrated in FIG. 5, the compute nodes 112 may transfer debug data to respective I/O nodes via the local tree network 113 (see also FIG. 1B). A debugger proxy program 510 at each I/O node 111 may receive the debug data from each compute node 112 and combine the debug data. The combined debug data may be sent by the debugger proxy program 510 to the debug program 122 via the functional network 106.

In one embodiment, the debugger proxy 510 may determine which function is being executed by each of its respective compute nodes based on the debug data. For example, compute node 111a in FIG. 5 may receive debug data from compute nodes 112a-c indicating that the compute nodes 112a-c are executing function 1. Accordingly, the debugger proxy program 510 may combine the data by simply indicating to the debug program 122 that all nodes associated with I/O node 111a are executing function 1. By combining the debug data in such manner, transferring debug data of each compute node 112 individually to the service node 102 may be avoided. In systems where a large number of compute nodes 112 (for example, 64) are coupled to each I/O node 111, the reduction in the amount of debug data transferred from the compute nodes to the service node may be significant, thereby making the retrieval of debug data more efficient.

While indicating the particular function being executed at each compute node 112 is described hereinabove, in alternative embodiments, any type of debug data, for example, values stored in a register or a particular memory location may be returned transferred to the I/O node 111 from each respective compute node 112. The debug data may be combined and transferred to the service node via the functional network as described above.

In one embodiment of the invention, each I/O node 111 may combine its own respective debug data with the debug data retrieved from respective compute nodes 112. For example, each I/O node may include debug data in its own respective stack, registers, memory, etc. The debug data at the I/O node may be provided to the debug program 122 via the functional network 105 in combination with the debug data from the compute nodes 112.

In one embodiment of the invention, a time-out period may be implemented by the debugger proxy 510 for receiving debug data from the compute nodes 112. For example, after the interrupt signal is received by an I/O node 111, the debugger proxy 510 may wait for a predetermined period of time to receive debug data from its respective compute nodes 112. If the debug data is not received from one or more compute nodes 112 by the end of the predetermined period of time, the debugger proxy 510 may identify the non-responding compute nodes to the debug program 122.

In one embodiment of the invention, upon receiving the combined debug data from the I/O nodes 111, the debug program 122 may analyze the combined debug data to identify erroneous nodes. For example, in the previously described example, if all the compute nodes in the system (or a partition) except one node were executing function 1, then the node not executing function 1 may be determined to be a potentially erroneous node. In one embodiment, non-responding nodes may also be considered potentially erroneous nodes.

The debug program may initiate JTAG accesses to compute nodes determined to be potentially erroneous via the service network 106 and the hardware controllers 108, in one embodiment. The JTAG accesses may retrieve detailed node state data for example, any combination of status of registers, stack data, memory contents and the like. In other words, the detailed debug data retrieved from the nodes via the JTAG accesses may include debug data not retrieved in response to performing the operation or operations associated with the opcode. The detailed node state data retrieved from the potentially erroneous compute nodes may be used to diagnose the error condition.

Figure 6:
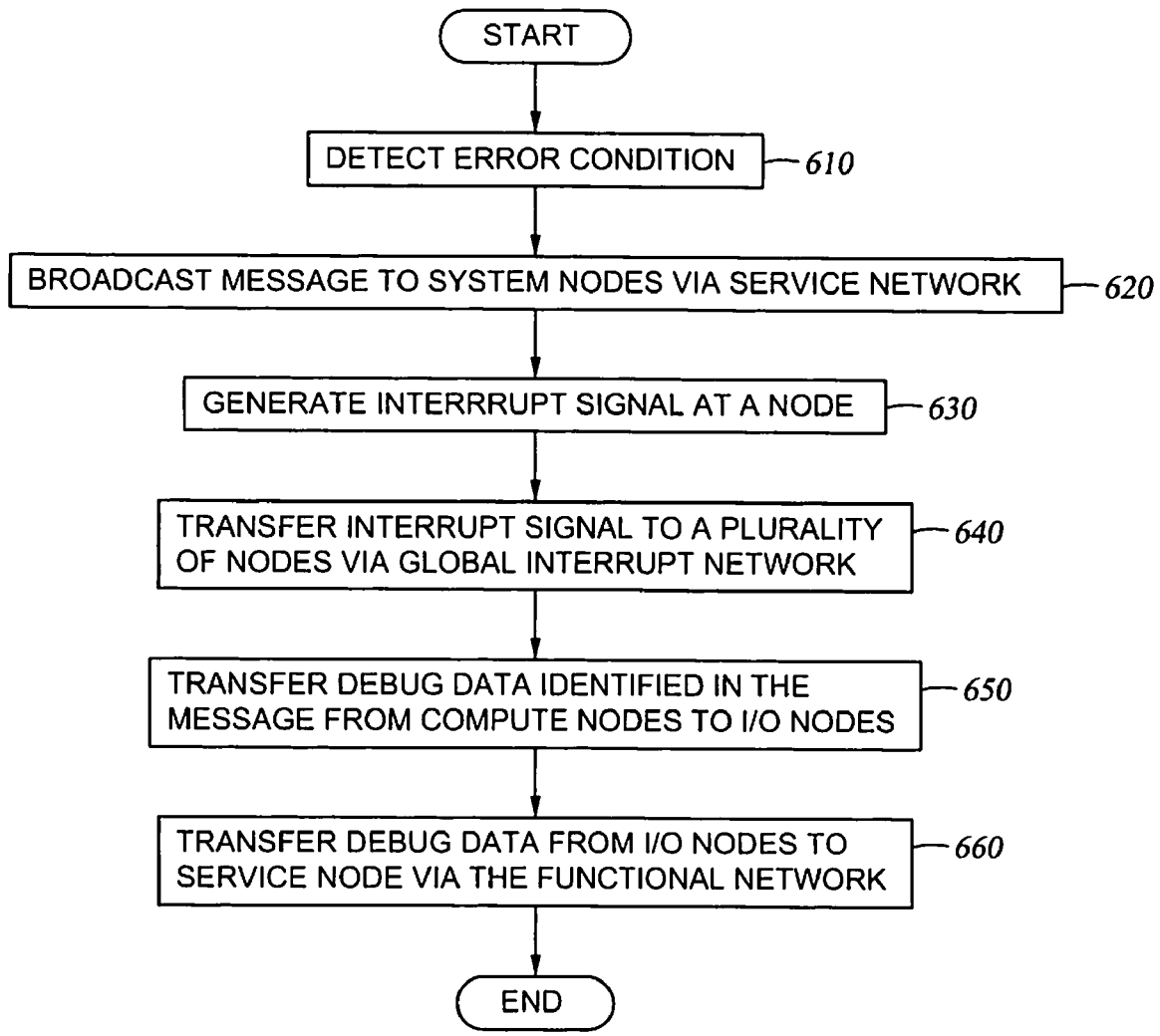
FIG. 6 is a flow diagram of exemplary operations performed to retrieve debug data, according to an embodiment of the invention.

FIG. 6 is a flow diagram of exemplary operations performed by system 100 for retrieving debug data from a plurality of nodes. The operations may begin in step 610 by detecting an error condition. For example, when the system 100 or a partition of system 100 takes an unusually long time to complete a task, or an unexpected result is received, an error condition may exist. In step 620, a debug program 122 at the service node may broadcast a message to the compute nodes 112 and/or I/O nodes 111 via the service network 106. In one embodiment, the message may include an opcode that may cause the system nodes to perform a debug operation.

In step 630, the debug program 122 may generate an interrupt signal at a particular node of system 100. In step 640, the interrupt signal may be transferred with relatively low latency from the particular node to a plurality of nodes of system 100 via a global tree network, for example, the global tree network 220 illustrated in FIG. 2B. In step 650, the compute nodes 112 of system 100 (or a partition of system 100) may perform the debug operation indicated in the message broadcast by the debug program 122. The debug operation may involve transferring debug data from the compute nodes 112 to a respective I/O node 111. In step 660, the I/O nodes 111 may transfer debug data to the debug program 122 at the service node via the functional network 105. In one embodiment, the I/O node may combine debug data received from a plurality of compute nodes prior to transferring the debug data.

In an alternative embodiment of the invention, the debug proxy program 510 of each I/O node 111 may store the debug data received from each compute node 112 at the I/O node 111. The debug program 122 may be configured to access the I/O nodes 111 via the functional network 105 and retrieve the debug data stored therein after, for example, the predetermined time period.

After debugging operations have been completed, in one embodiment, the debug program 122 may be configured to broadcast a second message to system nodes. As with the message described with respect to FIG. 4 second message may also be broadcast via the control system network 106. The second message may cause the nodes to resume execution of respective applications.

CONCLUSION

By providing an efficient method for retrieving debug data from a plurality of nodes of a massively parallel computer system, embodiments of the invention greatly reduce the amount of time required for debugging the nodes, thereby enhancing the performance of the massively parallel computer system.

While the foregoing is directed to embodiments of the present invention, other and further embodiments of the invention may be devised without departing from the basic scope thereof, and the scope thereof is determined by the claims that follow.

What is claimed is:

1. A method of retrieving debug data from a plurality of nodes of a parallel computer system, each node comprising at least one processor and memory, the plurality of nodes comprising at least one first node, a plurality of second nodes coupled with the first node, and a third node, comprising:
   broadcasting a message from a service node of the computer system to the plurality of nodes via a first network connecting the service node to the plurality of nodes, wherein the message indicates a debug operation to be performed by the plurality of nodes;
   generating an interrupt signal at the third node;
   transferring the interrupt signal from the third node to remaining nodes of the plurality of nodes via a second network coupling each node of the plurality of nodes to at least one other node; and
   at each of the second nodes, in response to receiving the interrupt signal, performing the debug operation comprising transferring debug data from the second node to the respective first node.

2. The method of claim 1, further comprising transferring the debug data from the at least one first node to the service node via a third network connecting the at least one first node to the service node.

3. The method of claim 1, wherein the at least one first node is an input/output node configured to transfer data to and from respective second nodes and wherein each second node is a compute node configured to execute an application.

4. The method of claim 1, wherein the first network comprises a JTAG network, and wherein broadcasting the message from the service node to the plurality of nodes comprises performing JTAG accesses to the plurality of nodes.

5. The method of claim 1, wherein generating the interrupt signal at the third node comprises performing, by the service node, a JTAG access to the third node via the first network.

6. The method of claim 1, wherein the second network is an asynchronous network.

7. The method of claim 1, wherein each of the plurality of nodes of the second network is coupled to at least two nodes.

8. The method of claim 1, further comprising combining, by the first node, the debug data received from each respective second node and transferring the combined debug data to the service node.

9. The method of claim 1, wherein the debug data includes stack trace data stored at the second node.

10. A computer readable storage medium comprising a program product which, when executed by a processor is configured to perform an operation for retrieving debug data from a plurality of nodes of a parallel computer system, each node comprising at least one processor and memory, the plurality of nodes comprising at least one first node, a plurality of second nodes coupled with the first node, and a third node, the operation comprising:
   broadcasting a message from a service node of the computer system to the plurality of nodes via a first network connecting the service node to the plurality of nodes, wherein the message indicates a debug operation to be performed by the plurality of nodes;
   generating an interrupt signal at the third node;
   transferring the interrupt signal from the third node to remaining nodes of the plurality of nodes via a second network coupling each node of the plurality of nodes to at least one other node; and
   at each of the second nodes, in response to receiving the interrupt signal, performing the debug operation comprising transferring debug data from the second node to the respective first node.

11. The computer readable storage medium of claim 10, wherein the operation further comprises transferring the debug data from the at least one first node to the service node via a third network connecting the at least one first node to the service node.

12. The computer readable storage medium of claim 10, wherein the at least one first node is an input/output node configured to transfer data to and from respective second nodes and wherein each second node is a compute node configured to execute an application.

13. The computer readable storage medium of claim 10, wherein the first network comprises a JTAG network, and wherein broadcasting the message from the service node to the plurality of nodes comprises performing JTAG accesses to the plurality of nodes.

14. The computer readable storage medium of claim 10, wherein generating the interrupt signal at the third node comprises performing, by the service node, a JTAG access to the third node via the first network.

15. The computer readable storage medium of claim 10, wherein the second network is an asynchronous network.

16. The computer readable storage medium of claim 10, wherein each of the plurality of nodes of the second network is coupled to at least two nodes.

17. The computer readable storage medium of claim 10, the operation further comprising combining the debug data received from each respective second node and transferring the combined debug data to the service node.

18. The computer readable storage medium of claim 10, wherein the debug data includes stack trace data stored at the second node.

19. A parallel computer system, comprising:
a plurality of nodes comprising at least one first node, a plurality of second nodes coupled with the at least one first node, and a third node, wherein each of the plurality of nodes comprise at least one processor and memory; and
a service node comprising a debug program which, when executed by a processor of the service node is configured to:
broadcast a message to the plurality of nodes via a first network connecting the service node to the plurality of nodes, wherein the message indicates a debug operation to be performed by the plurality of nodes; and
generate an interrupt signal at the third node of the plurality of nodes,
wherein the third node is configured to transfer the interrupt signal to remaining nodes of the plurality of nodes via a second network coupling each node of the plurality of nodes to at least one other node, upon receiving the interrupt signal, and
wherein each of the second nodes is configured to perform the debug operation by transferring debug data from the second node to the respective first node, upon receiving the interrupt signal.

20. The system of claim 19, wherein the at least one first node is configured to transfer the debug data to the service node via a third network connecting the at least one first node to the service node.

21. The system of claim 19, wherein the at least one first node is an input/output node configured to transfer data to and from respective second nodes, and wherein each second node is a compute node configured to execute an application.

22. The system of claim 19, wherein the first network comprises a JTAG network, and wherein broadcasting the message from the service node to the plurality of nodes comprises performing JTAG accesses to the plurality of nodes.

23. The system of claim 19, wherein each of the plurality of nodes of the second network is coupled to at least two nodes.

24. The system of claim 19, wherein the at least one first node comprises a debugger proxy program, which, when executed by a processor of the at least one first node is configured to combine the debug data received from each respective second node and transfer the combined debug data to the service node.

25. The system of claim 19, wherein generating the interrupt signal at the third node comprises performing, by the service node, a JTAG access to the third node via the first network.

* * * * *